United States Patent
Li et al.

(10) Patent No.: US 10,972,941 B2
(45) Date of Patent: Apr. 6, 2021

(54) FRONT-HAUL TRANSPORT NETWORK, DATA TRANSMISSION METHOD, APPARATUS AND COMPUTER STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Han Li, Beijing (CN); Weiqiang Cheng, Beijing (CN); Lei Wang, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 95 days.

(21) Appl. No.: 16/466,020

(22) PCT Filed: Dec. 25, 2017

(86) PCT No.: PCT/CN2017/118406
§ 371 (c)(1),
(2) Date: Jun. 1, 2019

(87) PCT Pub. No.: WO2018/113797
PCT Pub. Date: Jun. 28, 2018

(65) Prior Publication Data
US 2019/0313288 A1    Oct. 10, 2019

(30) Foreign Application Priority Data

Dec. 23, 2016  (CN) .......................... 201611209301.0
Dec. 23, 2016  (CN) .......................... 201611209501.6

(51) Int. Cl.
*H04W 28/20*    (2009.01)
*H04W 76/14*    (2018.01)
(Continued)

(52) U.S. Cl.
CPC .......... *H04W 28/20* (2013.01); *H04W 24/02* (2013.01); *H04W 28/0284* (2013.01);
(Continued)

(58) Field of Classification Search
CPC ..... H04W 28/20; H04W 24/02; H04W 76/00; H04W 88/08; H04W 76/14;
(Continued)

(56) References Cited

U.S. PATENT DOCUMENTS

2010/0184178 A1    7/2010  Beck
2012/0311173 A1   12/2012  Agarwal
(Continued)

FOREIGN PATENT DOCUMENTS

CN    101098328 A    1/2008
CN    101771591 A    7/2010
(Continued)

OTHER PUBLICATIONS

Supplementary European Search Report in the European application No. 17882822.4, dated Aug. 29, 2019.
(Continued)

*Primary Examiner* — Walli Z Butt
(74) *Attorney, Agent, or Firm* — Syncoda LLC; Feng Ma

(57) ABSTRACT

A front-haul transport network and a data transmission method, the front-haul transport network including: an access type front-haul transport node (FTN-ACC), used for connecting to a remote radio unit (RRU); an aggregate type front-haul transport node (FTN-AGG), one end of which is connected to the FTN-ACC and the other end of which is connected to baseband processing units (BBUs); at least two
(Continued)

transmission channels having different transmission delays are established between the FTN-ACC and the FTN-AGG, the FTN-ACC and/or the FTN-AGG being specifically used for selecting a corresponding transmission channel for carrying out transmission according to time delay requirements for data.

21 Claims, 14 Drawing Sheets

(51) Int. Cl.
  *H04W 28/02* (2009.01)
  *H04W 28/22* (2009.01)
  *H04W 56/00* (2009.01)
  *H04W 72/04* (2009.01)
  *H04W 88/08* (2009.01)
  *H04W 24/02* (2009.01)
  *H04W 76/00* (2018.01)

(52) U.S. Cl.
  CPC ....... *H04W 28/22* (2013.01); *H04W 56/0045* (2013.01); *H04W 72/0446* (2013.01); *H04W 76/00* (2013.01); *H04W 76/14* (2018.02); *H04W 88/08* (2013.01); *H04W 88/085* (2013.01)

(58) Field of Classification Search
  CPC ............. H04W 28/0284; H04W 28/22; H04W 56/0045; H04W 72/0446; H04W 88/085
  See application file for complete search history.

(56) References Cited

U.S. PATENT DOCUMENTS

| | | | |
|---|---|---|---|
| 2014/0226736 A1 | 8/2014 | Niu | |
| 2016/0205611 A1 | 7/2016 | Kobayashi et al. | |
| 2016/0241468 A1 | 8/2016 | Sabella et al. | |
| 2018/0077006 A1* | 3/2018 | Cui | H04L 41/0816 |
| 2018/0124482 A1* | 5/2018 | Bottari | H04Q 11/0066 |
| 2018/0287696 A1* | 10/2018 | Barbieri | H04W 36/22 |

FOREIGN PATENT DOCUMENTS

| | | |
|---|---|---|
| CN | 102196482 A | 9/2011 |
| CN | 103428125 A | 12/2013 |
| CN | 103477595 A | 12/2013 |
| CN | 104333727 A | 2/2015 |
| CN | 104734899 A | 6/2015 |
| CN | 105450373 A | 3/2016 |
| CN | 106888473 A | 6/2017 |
| CN | 106888513 A | 6/2017 |
| EP | 2530969 A1 | 12/2012 |
| JP | 2014160967 A | 9/2014 |
| JP | 2015520590 A | 7/2015 |
| JP | 2016208354 A | 12/2016 |
| KR | 20130093789 A | 8/2013 |
| WO | 2013048526 A1 | 4/2013 |
| WO | 2015049013 A1 | 4/2015 |
| WO | 2016113469 A1 | 7/2016 |
| WO | 2016145371 A2 | 9/2016 |
| WO | 2016190302 A1 | 12/2016 |

OTHER PUBLICATIONS

Artuso Matteo et al: "Fronthaul dimensioning in C-RAN with web traffic for coordinated multipoint joint transmission", 2015 IEEE International Conference on Communication Workshop (ICCW), IEEE, Jun. 8, 2015 (Jun. 8, 2015), pp. 50-55, XP033202715, DOI: 10.1109/ICCW.2015.7247154 [retrieved on Sep. 8, 2015] * paragraphs I and II * * figures 1 and 2 *.

Liu Xiang et al: "Efficient Mobile Fronthaul Transmission of Multiple LTE-A Signals with 36.86-Gb/s CPRI-Equivalent Data Rate using a Directly-Modulated Laser and Fiber Dispersion Mitigation", 2014 Asia Communications and Photonics Conference (ACP), OSA, Nov. 11, 2014 (Nov. 11, 2014), pp. 1-3, XP033538348, [retrieved on Apr. 10, 2019] * paragraphs 1 and 2 * * figure 1 *.

International Search Report in the international application No. PCT/CN2017/118406, dated Mar. 15, 2018.

English translation of the Written Opinion of the International Search Authority in the international application No. PCT/CN2017/118406, dated Mar. 15, 2018.

* cited by examiner

FRONT-HAUL TRANSPORT NETWORK, DATA TRANSMISSION METHOD, APPARATUS AND COMPUTER STORAGE MEDIUM

CROSS-REFERENCE TO RELATED APPLICATION

The present application claims benefit of Chinese Applications No. 201611209301.0, No. 201611209501.6, filed on Dec. 23, 2016, the contents of which are hereby incorporated by reference in their entirety.

TECHNICAL FIELD

The disclosure relates to the field of network technology, and in particular to a front-haul transport network (FTN), a method and a device for data transmission, and a computer storage medium.

BACKGROUND

The FTN is a transport network between a remote radio unit (RRU) and a base band unit (BBU). A front end of the FTN is connected to the RRU, and a back end of the FTN is connected to a BBU pool consisted of multiple BBUs.

In the related art, the FTN is connected to the RRU and the BBU pool in the following several ways.

In a first way, a manner of an optical fiber direct connection is used. Each RRU and the BBU pool are connected by using a pair of optical fibers. In this case, the number of pairs of the optical fibers used in the FTN is large, and an effective utilization rate of a single pair of the optical fibers is low.

In a second way, a manner of a color optical fiber direct connection is used. Multiple RRUs share a pair of optical fibers that can transmit different wavelengths, and are connected to the BBU pool. The manner of color optical fiber direct connection requires each base station to allocate different wavelengths, which makes it difficult to satisfy the transmission requirements of certain services with high transmission delay requirements.

In a third way, a scheme to provide a front-haul transport bearer based on an existing transport network, such as an optical transport network (OTN) or a packet transport network (PTN) is used. At present, the OTN or PTN node has a processing delay above 50 us, but a desired end-to-end delay of the most sensitive service in the FTN is less than 100 us. Apparently, it is difficult to satisfy such low delay requirements in multi-hop networking.

Therefore, providing an FTN that can satisfy the transmission delay requirement and reduce cost of fault location and/or maintenance is a problem to be solved in the related art.

SUMMARY

In view of this, embodiments of the present disclosure are expected to provide an FTN, a method and a device for data transmission, and a computer storage medium, at least in part to solve the above problem.

The technical solution of the present disclosure is implemented as follows.

In a first aspect of the embodiments of the present disclosure, it provides an FTN, which includes an access-type front-haul transport node (FTN-ACC) and an aggregation-type front-haul transport node (FTN-AGG).

The FTN-ACC is configured to be connected to a RRU.

The FTN-AGG has one end connected to the FTN-ACC and the other end connected to a BBU pool.

At least two types of transmission channels with different transmission delays are established between the FTN-ACC and the FTN-AGG. The FTN-ACC and/or the FTN-AGG are/is configured to select a corresponding transmission channel for transmission according to a delay requirement of data.

In a second aspect of the embodiments of the present disclosure, it provides a method for data transmission, which is applied to an FTN. The FTN includes an FTN-ACC and an FTN-AGG. The FTN ACC is connected to a RRU. The FTN-AGG is connected to the FTN-ACC and a BBU pool respectively. The method includes the following operations.

A transmission channel established between the FTN-ACC and the FTN-AGG is selected according to a delay requirement of the data. The data is sent by using the transmission channel.

In a third aspect of the embodiments of the present disclosure, it provides a device for data transmission, which is configured to control data transmission of an FTN. The FTN includes an FTN-ACC and an FTN-AGG. The FTN-ACC is connected to a RRU. The FTN-AGG is respectively connected to the FTN-ACC and a BBU pool. The device for data transmission includes a selecting unit and a first sending unit.

The selecting unit is configured to select, according to a delay requirement of data, a transmission channel established between the FTN-ACC and the FTN-AGG.

The first sending unit is configured to send the data by using the transmission channel.

In a fourth aspect of the embodiments of the present disclosure, it provides a computer storage medium, where the computer storage medium stores computer executable instructions. When the computer executable instructions are executed, the method for data transmission provided by the one or more technical solutions can be implemented.

In the FTN, the method and device for data transmission, and the computer storage medium in the embodiments of the present disclosure, an FTN for connecting the RRU and the BBU is divided into FTN-ACC and FTN-AGG. At least two types of transmission channels are established between the two types of transport nodes. The two types of transmission channels have different transmission delays and effective utilization rates of transmission resources. When data transmission is performed, a corresponding transmission channel is selected for transmission according to a delay requirement of data. Accordingly, it can satisfy the delay requirement of data transmission on one hand, and it can improve the effective utilization rate of the transmission resources as much as possible on the other hand, thereby satisfying the delay requirement of the data transmission, reducing idle-load of the transmission resources, and improving effective utilization of the resources.

DETAILED DESCRIPTION

The technical solutions of the present disclosure are further elaborated below in conjunction with the drawings and specific embodiments of the specification.

Figure 1:
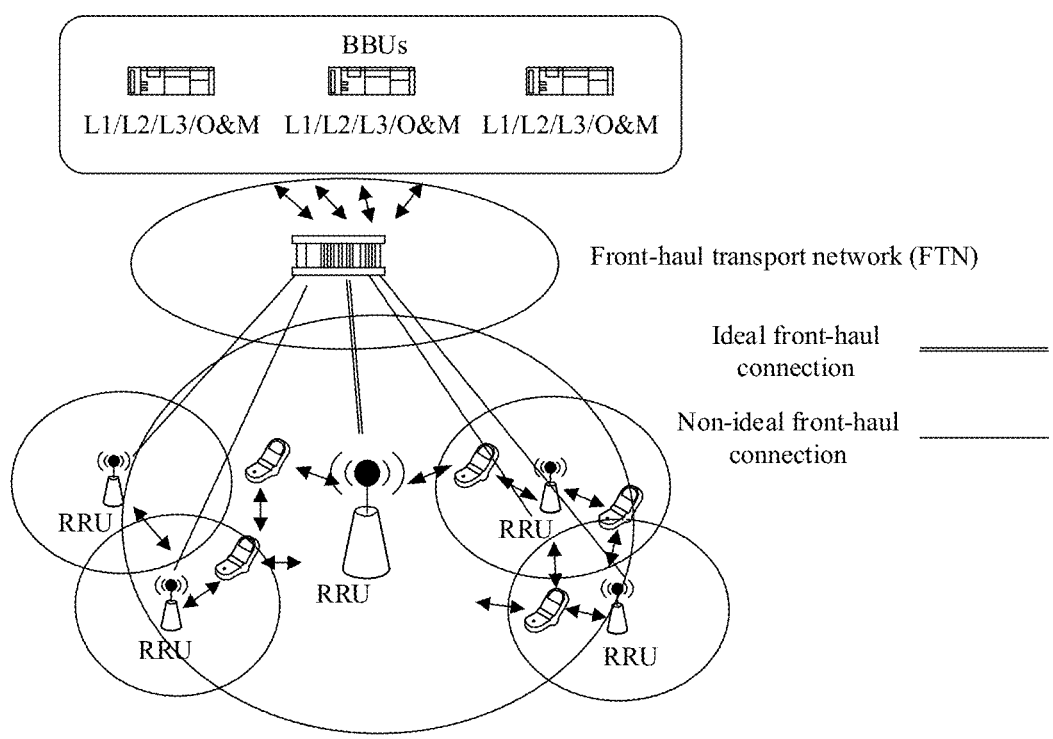
FIG. 1 illustrates a schematic diagram of a connection between an FTN and BBUs and an RRU according to an embodiment of the present disclosure.
Figure 2:
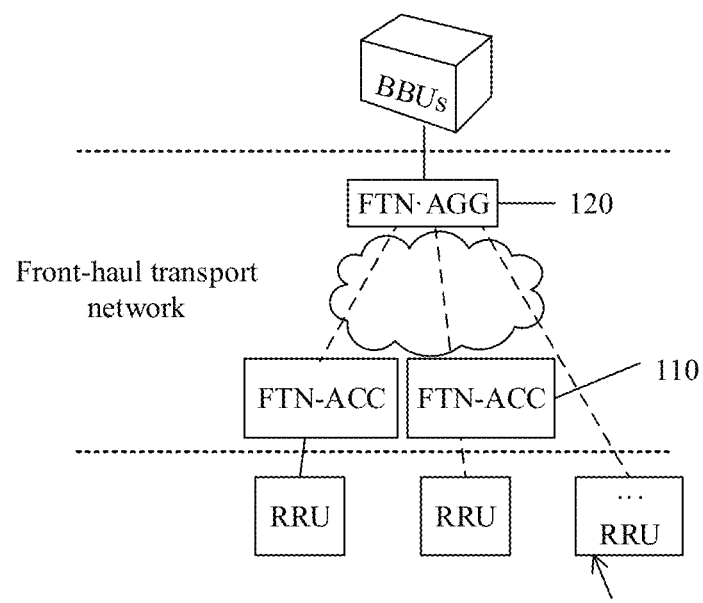
FIG. 2 illustrates a schematic diagram of a structure of an FTN, the FTN, BBUs and RRUs according to an embodiment of the present disclosure.
Figure 3:
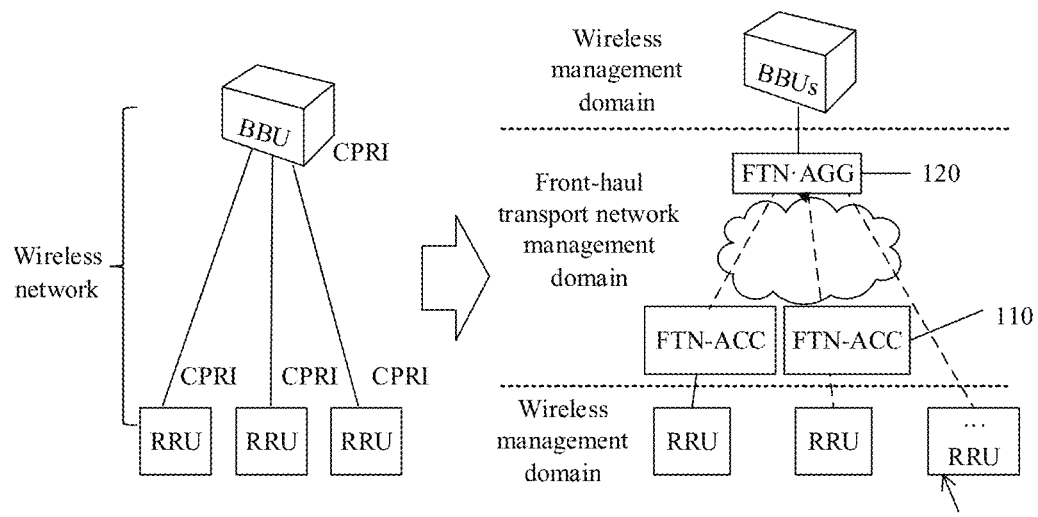
FIG. 3 illustrates a schematic diagram of another FTN structure, the FTN, BBUs and RRUs according to an embodiment of the present disclosure.

As illustrated in FIG. 1, an FTN is provided in this embodiment. One end of the FTN is connected to a RRU, and the other end of the FTN is connected to BBUs. As illustrated in FIG. 2 and FIG. 3, the FTN may further include: an FTN-ACC 110 and an FTN-AGG 120.

The FTN-ACC 110 is configured to be connected to the RRU.

The FTN-AGG 120 has one end connected to the FTN-ACC and the other end connected to a BBU pool.

At least two types of transmission channels having different transmission delays are established between the FTN-ACC 110 and the FTN-AGG 120. The FTN-ACC 110 and/or the FTN-AGG 120 are/is configured to select, according to a delay requirement of data, a corresponding transmission channel for transmission.

In this embodiment, at least two types of transmission channels are configured between the FTN-ACC and the FTN-AGG. In this embodiment, the transmission channels may be logical channels.

Different transmission channels have different transmission delays, so that when the service transmission is performed, the FTN-ACC and/or the FTN-AGG can select a corresponding transmission channel for data transmission according to the delay requirement of the currently transmitted data, thereby satisfying transmission delays of different data.

When data is transmitted from the FTN-ACC to the FTN-AGG, the data corresponds to uplink data which is uploaded to a base station by a user equipment (UE) on a wireless side. When data is transmitted from the FTN-AGG to the FTN-ACC, the data corresponds to downlink data which is downloaded to the UE by a base station.

In this embodiment, the FTN-ACC and the FTN-ACG are communication nodes, including: a communication interface and a processor. The processor is connected to the communication interface and configured to control data transmission of the communication interface.

At least two types of transmission channels are configured in this embodiment. Usually, different transmission channels have different transmission delays, so that effective utilization rates of the corresponding transmission resources are different. Generally, the less the transmission delay is, the lower the effective utilization rate of the transmission resources is. When the transmission delay is larger, the effective utilization rate of the transmission resources is higher. In this embodiment, at least two types of transmission channels are configured between the FTN-ACC and the FTN-AGG. In this case, services with high delay requirements are transmitted as much as possible by using channels with small transmission delays. For services with low delay requirements, a transmission channel with a large transmission delay can be selected according to the delay requirement of the data while satisfying the delay requirement, to maximize the effective utilization of transmission resources. Accordingly, the transmission delays of various data can be ensured on one hand, the effective utilization of the transmission resources can be maximized on the other hand. Apparently, it is not necessary to establish a pair of optical fibers for transmission between each RRU and BBU, and it is not necessary to use color optical fibers, and thus avoid the problem that certain service requirements cannot be satisfied.

For example, as illustrated in FIG. 1, the data may include ideal front-haul transport data sent by an ideal front-haul transport RRU and non-ideal front-haul transport data transmitted by a non-ideal front-haul transport RRU. The ideal front-haul transport data needs to be transmitted by using a transmission channel with a small transmission delay, and the non-ideal front-haul transport data may be transmitted by a transmission channel with a high resource utilization rate but a slightly larger transmission delay.

As illustrated in FIG. 3, the FTN and a wireless network may be divided into a forwarding domain and a management domain. The management domain is used for network management, and the forwarding domain performs data transmission based on management of the management domain. In this embodiment, a management domain of the FTN and a management domain of the wireless network are separated. The management domain of the wireless network manages the RRU and the BBUs. The management domain of the FTN manages data forwarding of the FTN, for example, according to the delay requirement of data, a corresponding channel is selected for transmission. Common public radio interfaces (CPRI) are illustrated in FIG. 3 and can be used to connect the BBU and the RRU.

Figure 4:
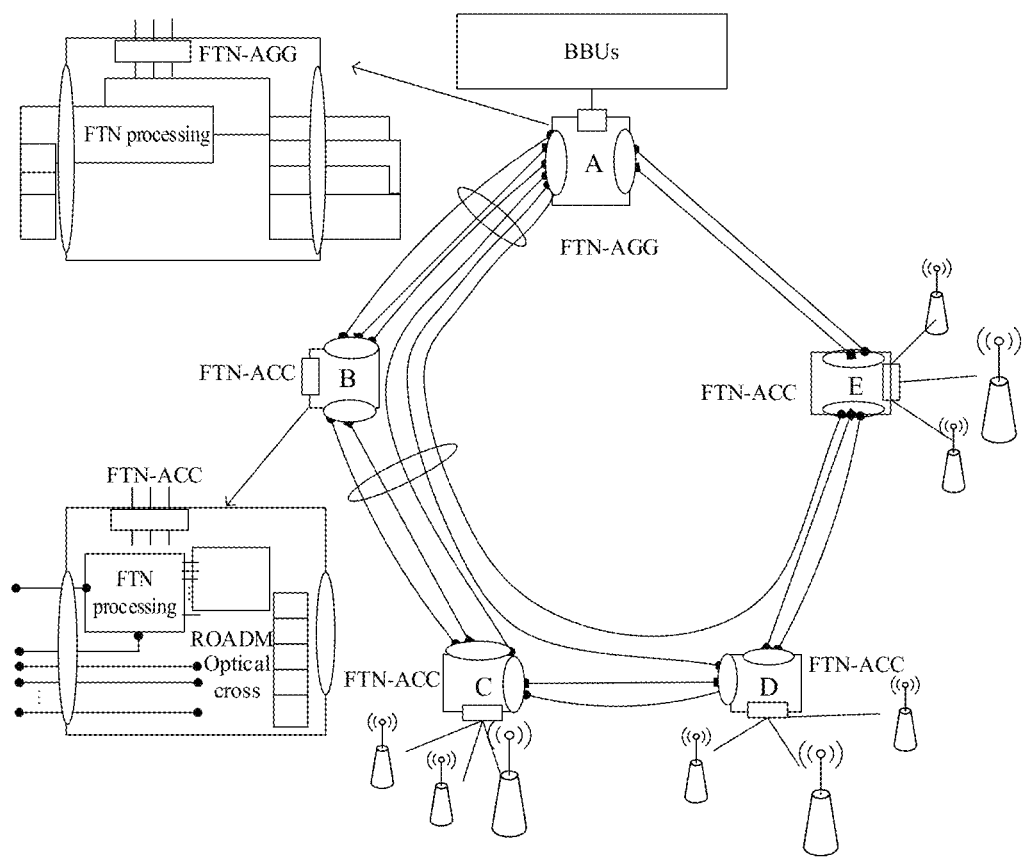
FIG. 4 illustrates a schematic diagram of a network topology of an FTN according to an embodiment of the present disclosure.

In this embodiment, a ring network or a star network is established between the FTN-ACC 110 and the FTN-AGG 120. FIG. 4 illustrates a ring network.

When a ring network is established, multiple FTN-ACCs 110 and one FTN-AGG 120 form a ring structure. Data may be transmitted from one FTN-AGG 120 to multiple FTN-ACCs 110, or from multiple FTN-ACCs 110 to one FTN-AGG 120.

Of course, the star structure is the following. The FTN-AGG 120 is a center of the star structure, and may be connected to multiple FTN-ACCs 110. A connection closed loop may not be formed between the FTN-ACCs 110.

Figure 5:
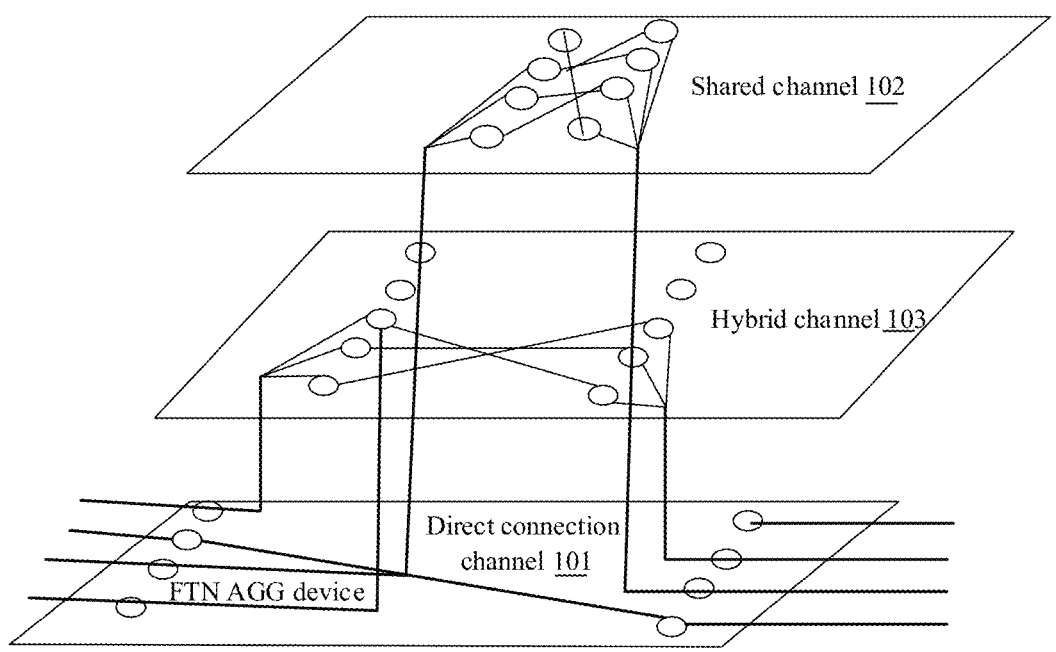
FIG. 5 illustrates a schematic diagram of a transmission channel of an FTN according to an embodiment of the present disclosure.

In some embodiments, as illustrated in FIG. 5, the transmission channel includes at least two of a direct connection channel 101, a shared channel 102 or a hybrid channel 103.

The direct connection channel 101 is a direct transmission channel that uses pre-allocated transmission resources for data transmission between a source node and a sink node. When the source node is the FTN-ACC, the sink node is the FTN-AGG. When the source node is the FTN-AGG, the sink node is the FTN-ACC.

In the embodiment, the direct connection channel 101 may directly correspond to a connection channel between the FTN-AGG 120 and the FTN-ACC 110 which is connected to the RRU. Upon reception of data, an intermediate node on the connection channel only performs transparent transmission forwarding the data, and data parsing, identification, and allocation of the transmission resources are no longer performed. In the direct connection channel 101, the transmission resources are pre-allocated. When the intermediate node receives data transmitted by the transmission resources, it directly forwards the data to a next transmission node according to the pre-configuration, rather than extracting a destination address in the data packet and performing an operation of allocation based on a current transmission resource status in combination with the destination address. Apparently, in this case, a transmission delay of the direct connection channel is short and constant, thereby low-delay transmission can be realized. However, the transmission resources are pre-allocated, which may result in waste of resources when the low-delay data is less.

The shared channel 102 is a statistical multiplexing channel that uses dynamically allocated transmission resources for transmission between any two adjacent transmission nodes. The shared channel is a transmission path between two FTN-ACCs, or a transmission path between the FTN-ACC and the FTN-AGG.

The transmission resources of the shared channel 102 are dynamically allocated. Upon reception of a data packet, any one of the transmission nodes on the shared channel 102 needs to extract relevant information in the data packet, such as a destination address. Then one transmission resource is dynamically allocated according to the current load status, and the data packet is transmitted to a next transmission node. Apparently, the transmission delay is uncertain, and since each transmission node needs to perform the parsing and identification of the data packet, and dynamic allocation of resources, the transmission delay is large. However, the shared channel 102 can maximize the efficient utilization of the transmission resources and save transmission power consumption as much as possible. For example, when an amount of currently transmitted data is small, this transmission channel can be used to transmit control plane signaling, and part of the transmission channels is closed. When the transmission channel is closed, it is not necessary for a corresponding device to provide power consumption to maintain the transmission channel, thereby saving the power consumption. The closed transmission channel here may be the direct connection channel 101 or the shared channel 102. The control plane signaling is transmitted by using the transmission channel, so that effective transmission can be improved. The aforementioned direct connection channel 101 is equivalent to a dedicated channel, which is a transmission channel that specifically allocated to some data or devices. It is equivalent that a type of the transmitted data is determined. Once determined, other data cannot be transmitted. When the data that can be transmitted by the direct connection channel 101 is less, apparently it will result in a certain waste of resources.

The hybrid channel includes a direct connection path and a shared path. The direct connection path is a path that uses predetermined and pre-allocated transmission resources for transmission between the transmission nodes. The shared path is a path that uses dynamically allocated transmission resources for transmission between the transmission nodes. The transport node maybe the FTN-ACC or the FTN-AGG.

For example, the ideal front-haul transport data needs to be transmitted by using a direct connection channel with a small transmission delay, and the non-ideal front-haul transport data may be transmitted by a shared channel or a hybrid channel with a high resource utilization rate but a slightly larger transmission delay.

The transmission resources include a transmission wavelength or a transmission slot. The transmission slot includes a transmission time duration used for a transmission wavelength.

The FTN may be a fiber optic transmission network, and the optical fiber transmission network uses optical waves for transmission. Broadcasting of different wavelengths during transmission is one type of the transmission resources.

In terms of time dimension, each of the optical waves can be time-multiplexed, so that transmission slots can be formed in combination with a transmission wavelength and the transmission time. Therefore, the classification of the direct connection channel 101, the direct connection path or the shared channel 102 can be determined depending on different allocation manners of the transmission resources.

The direct connection channel 101 is equivalent to pre-configuring transmission resources. Once the entire FTN knows the pre-configuring transmission resources, upon reception of the data transmitted by the transmission resources, the transmission node can no longer perform parsing and identification of data and resource allocation, and know which transmission node needs to be forwarded to, it is clear that transparent transmission of data with a low delay is achieved.

In some embodiments, the transmission channel further includes a protection channel. The protection channel is used as an alternate channel when the direct connection channel and/or the direct connection path fail (s).

In this embodiment, the transmission channel further includes a protection channel, and the protection channel may be substantially referred as an alternate channel. The alternate channel may be designed to transmit corresponding data when the direct connection channel or the direct connection link fails, to ensure the transmission delay of the data.

In this embodiment, in order to improve the effective utilization rate of the transmission resources and reduce idle-load of transmission resources, the protection channel may be further configured in a configuration manner of 1:N in addition of a configuration manner of 1:1. The N is the number of the direct connection channel(s) 101 or the direct connection path(s), and the number 1 is the number of the protection channels. The N may be an integer not less than 2. In this way, one protection channel is shared by multiple transmission channels and thus effective resource improvement is achieved. In this embodiment, the protection channel may be a special channel of the direct connection channel. For example, the transmission resources of the protection channel are pre-configured. In a specific implementation, the protection channel may also be a special channel of the shared channel. For example, the transmission resources of the protection channel are a type of dynamically allocated resources. Once the resource allocation is finished, the transmission resource is applicable to any one of the transmission nodes, and the transmission node performs transparent transmission when forwarding data.

Of course, in a specific implementation, the common shared channel 102 can directly be used as the protection channel. In this case, during the transmission, once a controller of the FTN finds failure of a direct connection channel 101 or of a direct connection path, the shared channel 102 is directly activated for data transmission. In this case, no dedicated protection channel is configured, so that the effective utilization of the transmission resources can be maximized and the transmission power consumption of the FTN can be reduced.

Figure 6:
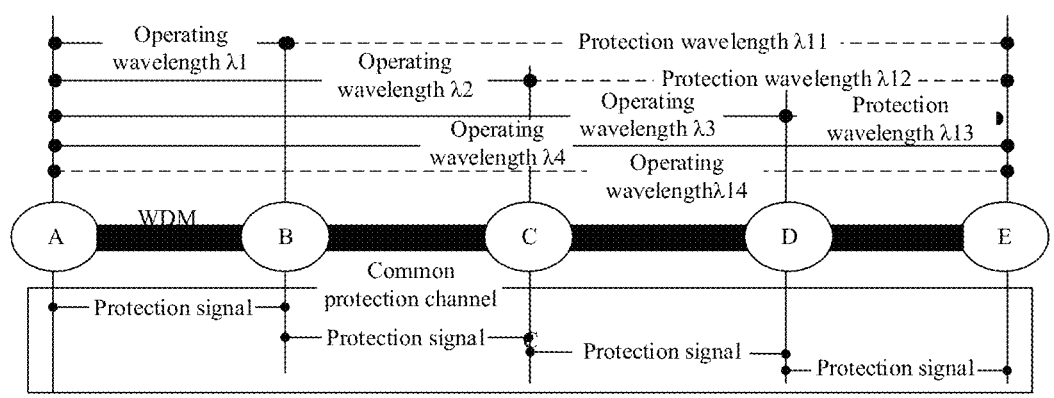
FIG. 6 illustrates a schematic diagram of correspondences between a transmission channel and a protection channel according to an embodiment of the present disclosure.

When the FTN has a ring network structure and a certain operating wavelength establishes a transmission channel in a clockwise direction, a protection channel of the transmission channel can be established in a counterclockwise direction. As illustrated in FIG. 6, the transmission nodes of the FTN, A, B, C, D, and E establish a ring network. Here, the transmission nodes of the FTN include FTN-ACC and FTN-AGG. An operating wavelength $\lambda 1$ and a protection wavelength $\lambda 11$ form a pair of a transmission channel and a protection channel; an operating wavelength $\lambda 2$ and a protection wavelength $\lambda 12$ form another pair of a transmission channel and a protection channel; an operating wavelength $\lambda 3$ and a protection wavelength $\lambda 13$ form another pair of a transmission channel and a protection channel; an operating wavelength $\lambda 4$ and a protection wavelength $\lambda 14$ form yet another pair of a transmission channel and a protection channel.

In some embodiments, the FTN further includes a controller. For example, the controller may be a controller of a software defined network (SDN).

The controller is configured to locate a fault between any two adjacent transmission nodes on the channel by using an operation administration and maintenance (OAM) mechanism when the transmission channel fails. For example, the controller may be specifically configured to locate a fault between any two adjacent nodes of the direct connection channel and/or the direct connection path by using the OAM mechanism when the direct connection channel and/or the direct connection path fail(s).

When locating the fault, the controller is configured to control an m-th detection wavelength to transmit detection data between a first transmission node and an m-th transmission node, where the m is less than M, and the M is a total number of transmission nodes through which a transmission path passes. For example, when the M is equal to 4, the detection is performed between the first transmission node and a second transmission node by using four different wavelengths. For example, the first transmission node sends detection data by using a first detection wavelength. The second transmission node, after receiving the detection data, sends feedback data by using the first detection wavelength. According to transmission conditions of the detection data and feedback data based on the detection data, a fault location and whether the two transmission nodes fail can be determined. For example, when the second transmission node does not receive the detection data, it is apparent that the first transmission node or a link from the first transmission node to the second transmission node has a failure. When the second transmission node receives the detection data, but the first detection node does not receive the feedback data, there may be a failure of the second transmission node or a failure of a return path. When the feedback data and a feedback path correspond to the same optical fiber or interface of the physical layer, it is apparent that the second transmission node fails. According to the OAM mechanism, a fault point can be easily and quickly located, and so forth.

Figure 7:
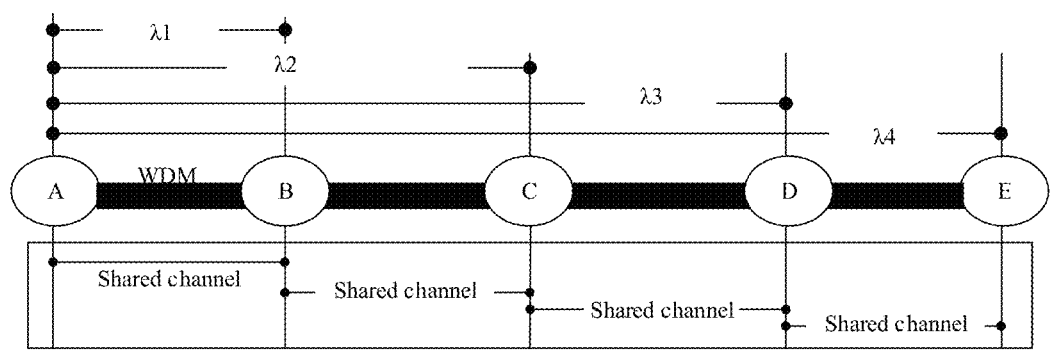
FIG. 7 illustrates a schematic diagram of locating a fault according to an embodiment of the present disclosure.

As illustrated in FIG. 7, at the transmission node A, the transmission node B, the transmission node C, and the transmission node D, the fault location between the corresponding transmission nodes can be performed by using the wavelength $\lambda 1$, the wavelength $\lambda 2$, the wavelength $\lambda 3$, and the wavelength $\lambda 4$ respectively, to realize operation and maintenance management.

Figure 8:
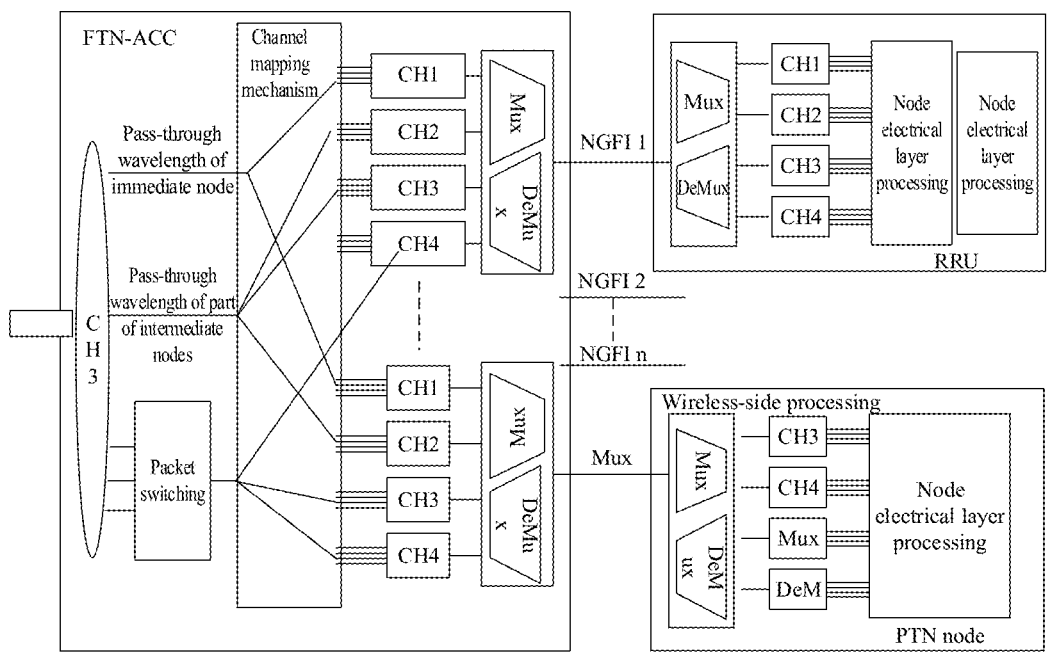
FIG. 8 illustrates a schematic diagram of structures and connections of an FTN-ACC, an RRU, and a PTN node according to an embodiment of the present disclosure.

As illustrated in FIG. 8, the FTN further includes a controller and an FTN interface, which is a next generation front-haul interface (NGFI) connected to the RRU. n NGFIs are illustrated in FIG. 8, numbered as NGFI 1, NGFI 2 . . . NGFI n respectively. The NGFI is used to obtain load status information. Both the RRU and the BBUs can be regarded as a wireless side of a wireless network. The NGFI is an interface connected to the RRU or the BBUs. In this embodiment, the NGFI interface can detect the load status information. For example, the load status information of the current FTN can be comprehensively determined according to the number of antennas and a modulation mode of the RRU, and the like. The load status information herein may be information capable of reflecting a transmission load or a transmission load rate of the FTN.

A multiplexer Mux and a demultiplexer DeMux are also illustrated in FIG. 8. There are three types of channels illustrated in FIG. 8: a pass-through wavelength of an intermediate node corresponding to the direct connection channel, a pass-through wavelength of part of intermediate nodes corresponding to the hybrid channel, and packet switching corresponding to the shared channel. The FTN-ACC performs mapping separately according to different selected channel. For the channel indicated by CH in FIG. 8, the numbers followed by the CH, for example, 1, 2, 3 and 4, indicate the number of the channel in the corresponding node. Generally, the FTN is a fiber-optic network. The RRU receives an electromagnetic signal sent by a terminal, and may need to perform node electrical layer processing and convert the electromagnetic signal into an optical signal for transmission.

The controller is configured to dynamically configure different types of the transmission channels according to the load status information.

The controller will dynamically configure different types of transmission channels according to the load information. Configuring transmission channels dynamically here may include adding a transmission channel and reducing a transmission channel. A specific configuration manner may include increasing transmission resources of the corresponding channel, or reducing transmission resources of the corresponding channel, thereby implementing dynamic configuration of the channels to satisfy transmission requirements under different load statuses, thereby reducing unnecessary idle-load statuses of the FTN transmission, and the waste of the transmission resources of the FTN is reduced. Specifically, for example, part of illumination devices may be turned off, thereby reducing the transmission of a specific wavelength, or activating part of the illumination devices, thereby activating a certain transmission wavelength. The controller can also implement dynamic configuration of the transmission channels by adjusting a transmission bandwidth of each wavelength. The load status information may include a wireless load index that is information reflecting a wireless load ratio.

A method for data transmission is provided in the embodiment, and is applied to an FTN. The FTN includes an FTN-ACC and an FTN-AGG. The FTN-ACC is connected to an RRU. The FTN-AGG is connected to the FTN-ACC and a BBU pool respectively. In summary, the method for data transmission in this embodiment is a method applied to the foregoing FTN.

Figure 9:
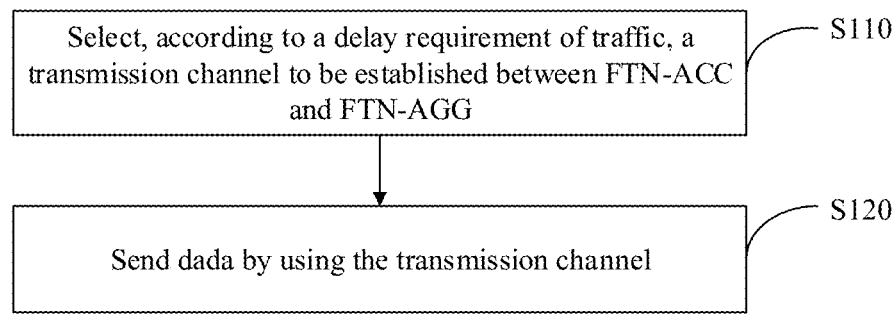
FIG. 9 illustrates a schematic flowchart of a method for data transmission according to an embodiment of the present disclosure.

As illustrated in FIG. 9, the method includes blocks S110 and S120.

At block S110, a transmission channel established between the FTN-ACC and the FTN-AGG is selected according to a delay requirement of data.

At block S120, the data is sent by using the transmission channel.

The method in this embodiment may be a method applied to a control plane of the FTN-ACC or the FTN-AGG. First, the FTN-ACC or FTN-AGG will acquire a delay requirement of the data. For example, the delay requirement of the data is determined according to a service type and a receiving interface of the data, and the like. Then, a transmission channel satisfying the delay requirement of the data is selected according to the delay requirement. Accordingly, the delay requirement of the data can be satisfied on one hand, and an effective utilization rate of the transmission resources can be improved as much as possible on the other hand. At block S120, the control plane can control a forwarding plane to perform data transmission by using a corresponding transmission channel.

In some embodiments, the transmission channel includes at least two of a direct connection channel, a shared channel or a hybrid channel. The direct connection channel is a direct transmission channel in which pre-allocated transmission resources are used for data transmission between a source node and a sink node. When the source node is the FTN-ACC, the sink node is the FTN-AGG; when the source node is the FTN-AGG, the sink node is the FTN-ACC.

The shared channel is a statistical multiplexing channel in which dynamically allocated transmission resources are used for transmission between any two adjacent transmission nodes. The shared channel is a transmission path between two FTN-ACCs, or a transmission path between the FTN-ACC and the FTN-AGG.

The hybrid channel includes a direct connection path and a shared path. The direct connection path is a path on which predetermined pre-allocated transmission resources are used for transmission between the transmission nodes. The shared path is a path on which dynamically allocated transmission resources are used for transmission between the transmission nodes. The transmission node is the FTN-ACC or the FTN-AGG.

The block S110 may include at least two of the following operations.

The direct connection channel is selected when the delay requirement corresponds to a first transmission delay;

the hybrid channel is selected when the delay requirement corresponds to a second transmission delay; or the shared channel is selected when the delay requirement corresponds to a third transmission delay.

The first transmission delay is less than the second transmission delay.

The second transmission delay is less than the third transmission delay.

In this embodiment, different transmission channels are equivalent to being in different transmission layers. It is equivalent that hierarchical transmission is performed according to the delay requirement of the data. Accordingly, transmission delays of different data can be satisfied, and effective utilization of resources can be maximized as much as possible by using the hierarchical transmission. Therefore, in this embodiment, for the data with high time delay requirement, the direct connection channel or the hybrid channel is preferentially used for data transmission. For the data with low delay requirement, the shared channel may be preferentially used for transmission. Accordingly, transmission delays of different data can be apparently satisfied, while maximizing the utilization of the transmission resources.

In some embodiments, the method further includes the following operation.

When the selected transmission channel fails, the data is transmitted by using a protection channel.

In this embodiment, when the selected transmission channel fails, the protection channel is directly activated for data transmission, and the protection channel is apparently introduced. The introduction of the protection mechanism can ensure that the delay requirement of the data is still satisfied when the transmission channel fails.

In some embodiments, the method further includes the following operations.

Load status information is obtained; and the transmission channel is dynamically configured according to the load status information.

For example, the NFGI is used to acquire parameters such as the wireless load index of the RRU. The transmission channel is dynamically configured according to the wireless load index. For example, the number of configured transmission channels may be determined according to the load status information. According to the load status information, a delay requirement corresponding to the current load can be determined, and a type and/or number of each type of transmission channel can be determined.

In some embodiments, the method further includes the following operation. A fault is located between any two adjacent transmission nodes in the transmission channel by using the OAM mechanism when the transmission channel fails.

In this embodiment, a controller of a control plane of the FTN can be used. When the transmission channel fails, a fault can be located node by node (i.e., hop by hop) by using the OAM mechanism, thereby conveniently and quickly locating the fault.

Figure 10:
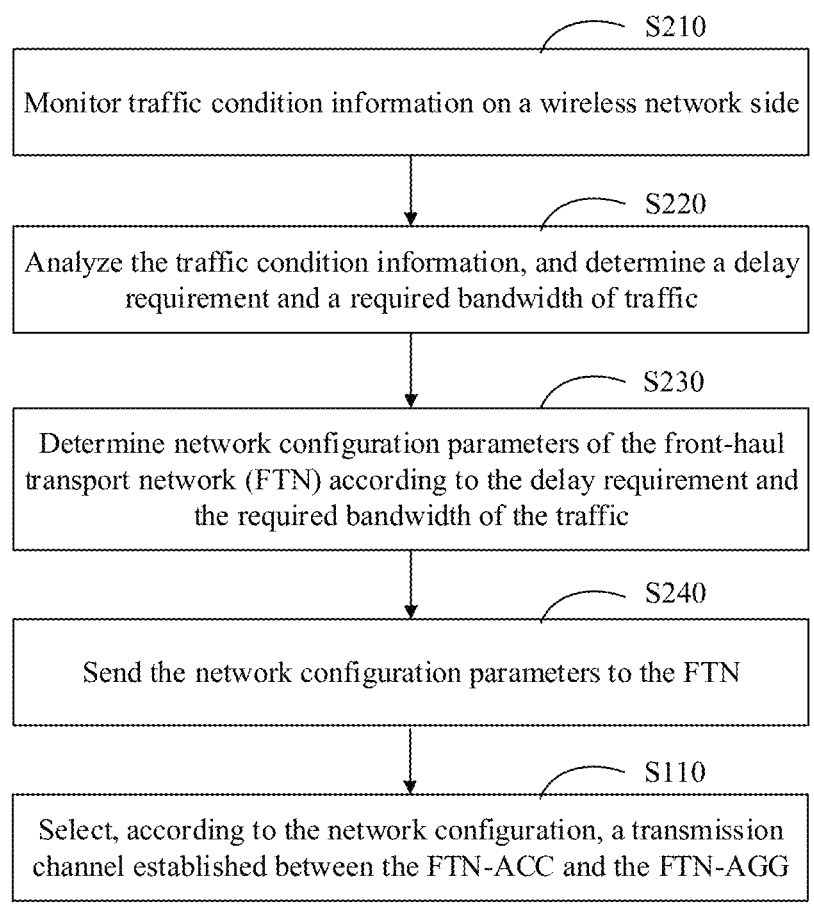
FIG. 10 illustrates a schematic flowchart of another method for data transmission according to an embodiment of the present disclosure.

As illustrated in FIG. 10, a method for controlling an FTN is provided in this embodiment, which includes the following operations.

At block S210, traffic condition information on a wireless network side is monitored.

At block S220, the traffic condition information is analyzed, and a delay requirement and a required bandwidth of traffic are determined.

At block S230, network configuration parameters of the FTN are determined according to the delay requirement and the required bandwidth of the traffic.

At block S240, the network configuration parameters are sent to the FTN.

Correspondingly, the block S110 may include the following operation. A transmission channel established between the FTN-ACC and the FTN-AGG is selected according to the network configuration parameters.

In the method in this embodiment, the traffic condition information of the data transmitted by the wireless network side is acquired automatically. The wireless network side here includes the RRU or BBU. In this embodiment, the block S210 may include acquiring traffic condition information at the RRU. For example, the traffic condition information at the RRU is perceived by using NGFI automatically. The RRU here is an access network that can be received by a UE, and can usually perform information interaction with the UE via an air interface. The more terminals access, the more information needs to be transmitted. The data transmitted by the FTN may also include uplink data to be transmitted from the RRU to the BBU, and may also include downlink data transmitted from the BBU to the RRU. The data traffic and data types of these data will be reflected at the RRU for convergence or aggregation. Of course, in a specific implementation, the traffic condition information at the BBU may also be monitored, thereby obtaining information, such as a traffic size and a traffic type, currently to be transmitted by the FTN network.

The block S210 may include the following operations. The traffic condition information is periodically monitored, the currently detected traffic condition information is analyzed, and a delay requirement and a required bandwidth of the traffic are determined. For example, the traffic condition information of an m-th period is monitored to obtain the delay requirement and the required bandwidth. At block S230, network configuration parameters of an (m+1)-th period are generated. The FTN will configure a network attribute and/or a network state for transmitting data in the (m+1)-th period according to the network configuration parameters. Of course, at block S210, the traffic condition information may also be monitored in real time, and the network configuration parameters are generated in real time. The network attribute and/or the network state of the FTN are/is adjusted in real time once the network configuration parameters are changed. Of course, the traffic condition information monitored at block S210 may also be statistical data in multiple monitoring periods before the present moment. At block S230, the network configuration parameters of the current period are obtained according to the statistics of the multiple historical periods, and are used for the configuration of the current network attribute and/or the network state of the FTN. The state herein may include an on or off state of the transmission node or port, and the network attribute may include various parameters, such as a type of the transmission channel, a type of services that can be carried, and so forth.

Upon detecting the traffic condition information, the delay requirement and the required bandwidth of the traffic will be obtained. Usually, the delay requirement depends on a type of data. The type of the data includes a service type. The required bandwidth depends on an amount of data.

At block S230, the network configuration parameters are determined according to the delay requirement and the required bandwidth, and are sent to the FTN. Upon receiving the network configuration parameters, the FTN configures and adjusts a network topology or a network architecture according to the network configuration parameters.

Research found that in the related art, the network configuration of the FTN is usually static. Once being configured, the configuration is rarely adjusted unless abnormal. In this case, when the transmitted traffic is very small, many devices that generate optical signals remain in a connected state or an illuminating state. It results in a significant increase of an idle-load ratio. On one hand, it consumes the power consumption required to generate transmit optical signals. On the other hand, the long-term use accelerates the aging of the device, which results in shortened service life of the device. More important thing is that an effective use rate of many resources is greatly reduced.

In some embodiments, the block S230 may include the following operations.

A type of a transmission channel to be configured by the FTN is determined according to the delay requirement; and/or a transmission bandwidth of the transmission channel to be configured by the FTN is determined according to the required bandwidth.

In this embodiment, the FTN can configure multiple types of transmission channels. The transmission channel here may be a logical channel. The transmission channel may include a direct connection channel, a shared channel and a hybrid channel. Usually, different transmission channels have different transmission delays, and the effective utilization ratios of the corresponding transmission resources are also different.

As illustrated in FIG. 5, the transmission channel includes at least two of a direct connection channel 101, a shared channel 102 or a hybrid channel 103.

The direct connection channel 101 is a direct transmission channel that uses pre-allocated transmission resources for data transmission between a source node and a sink node. When the source node is the FTN-ACC, the sink node is the FTN-AGG. When the source node is the FTN-AGG, the sink node is the FTN-ACC.

In the embodiment, the direct connection channel 101 may directly correspond to a connection channel between the FTN-AGG 120 and the FTN-ACC 110 connected to the RRU. Upon reception of data, an intermediate node on the connection channel only performs transparent transmission forwarding on the data, parsing and identification of data and allocation of the transmission resources are no longer performed. In the direct connection channel 101, transmission resources are pre-allocated. When the intermediate node receives data transmitted by using the transmission resources, it directly forwards the data to a next transmission node according to the pre-configuration, rather than extracting a destination address in the data packet and performing an operation of allocation based on a current transmission resource status in combination with the destination address. Apparently, in this case, a transmission delay of the direct connection channel is short and certain, thereby low-delay transmission can be realized. However, the transmission resources are pre-allocated, which may result in waste of resources when the low-delay data is less.

The shared channel 102 is a statistical multiplexing channel that uses dynamically allocated transmission resources for transmission between any two adjacent transmission nodes on the channel. The shared channel is a transmission path between two FTN-ACCs, or a transmission path between the FTN-ACC and the FTN-AGG.

The transmission resources of the shared channel 102 are dynamically allocated. Upon reception of a data packet, any one of the transmission nodes on the shared channel 102 needs to extract relevant information in the data packet, such as a destination address. Then in combination with the current load status, one transmission resource is dynamically allocated. The data packet is transmitted to a next transmission node. Apparently, the transmission delay is uncertain, and since it is necessary for each transmission node to perform parsing and identification of the data packet and dynamic allocation of resources, the transmission delay is large. However, the shared channel 102 can maximize the efficient utilization of the transmission resources and save transmission power consumption as much as possible. For example, when an amount of currently transmitted data is small, this transmission channel can be used to transmit control plane signaling, and part of the transmission channels are closed. When the transmission channel is closed, it is not necessary for a corresponding device to provide power consumption to maintain the transmission channel, thereby saving the power consumption. The closed transmission channel here may be the direct connection channel 101 or the shared channel 102. The control plane signaling is transmitted by using the transmission channel, so that effective transmission can be improved. The aforementioned direct connection channel 101 is equivalent to a dedicated channel, which is a transmission that specifically allocated to some data or devices. It is equivalent that a type of the transmitted data is quite determined. Once the type of the data is determined, other data cannot be transmitted. When the data that can be transmitted by the direct connection channel 101 is less, apparently it will result in a certain waste of resources.

The hybrid channel 103 includes a direct connection path and a shared path. The direct connection path is a path that predetermined and pre-allocated transmission resources are used for transmission between the transmission nodes. The shared path is a path that dynamically allocated transmission resources are used for transmission between the transmission nodes. The transmission node is the FTN-ACC or the FTN-AGG.

For example, the ideal front-haul transport data needs to be transmitted by using a direct connection channel with a small transmission delay, and the non-ideal front-haul transport data may be transmitted by a shared channel or a hybrid channel with a high resource utilization rate but a slightly larger transmission delay.

The transmission resources include a transmission wavelength or a transmission slot. The transmission slot includes a transmission time duration used for a transmission wavelength.

Therefore, in some embodiments, a type of a transmission channel to be opened may be determined according to the transmission delay of the data to be currently transmitted by the FTN. For example, when there is data with a high delay requirement currently, the direct connection channel 101 needs to be activated or configured. When current data is data with a low delay requirement, only the shared channel 102 needs to be activated.

For example, the block S230 may include at least one of the following.

When the delay requirement corresponds to a first transmission delay, it is determined that the network configuration parameters include configuration parameters of the direct connection channel;

when the delay requirement corresponds to a second transmission delay, it is determined that the network configuration parameters include configuration parameters of the hybrid channel; or when the delay requirement corresponds to a third transmission delay, it is determined that the network configuration parameters include configuration parameters of the shared channel. The first transmission delay is less than the second transmission delay, and the second transmission delay is less than the third transmission delay.

In some embodiments, a transmission bandwidth of the FTN is configured according to the required bandwidth, so that some bandwidth with no need to use can be turned off, thereby reducing idle-load of this part of the configured network bandwidth, reducing power consumption, and improving the effective using rate of resources.

There are multiple methods for determining the transmission bandwidth of the transmission channel to be configured by the FTN according to the required bandwidth. Several optional methods are provided in the following. In a specific implementation, a combination of one or more of the transmission channels may be used.

In a first optional method, the number of connection ports activated between the FTN and the RRU are determined according to the required bandwidth. Normally, the more number of activated ports, the larger configured transmission bandwidth and the more optical devices that generate optical signals for using as the carrier and the more resources are consumed. In this implementation, the number of connection ports between the FTN and the RRU will be determined according to the actual required bandwidth.

In a second optional method, the number of connection ports activated between the FTN and the BBU is determined according to the required bandwidth. Similarly, the number of connection ports between the FTN and the BBU is configured according to actual needs, thereby reducing unnecessary port connection, reducing unnecessary power consumption consumed by idle-load of the connection port, and reducing bandwidth resources and device hardware resources occupied by idle-load of the connection port In a third optional method, the number of carriers to be configured by the FTN is determined according to the required bandwidth. The carrier here may be an optical carrier, and the number of carriers is the number of carriers used to transmit data. Some devices can transmit a carrier having a specific wavelength. When a carrier is not currently configured for transmission, it is apparent that the device will not transmit a carrier optical signal having the wavelength, thereby reducing power consumption of the device. Of course, when the number of carriers is dynamically configured, apparently, the configuration of the maximum number of carriers is maintained consistently, and the unconfigured carrier can be used for achieving other purposes, thereby improving the overall resource utilization rate of the carrier.

In a fourth optional method, a convergence ratio between the FTN-ACC of the FTN and the FTN-AGG of the FTN is determined according to the required bandwidth. The FTN-ACC is connected to the RRU. The FTN-AGG is connected to the BBU.

As illustrated in FIG. 2, the FTN in this example may include FTN-ACC and FTN-AGG. In an embodiment, the convergence ratio may be a ratio of the number of port connections between the FTN and the RRU to the number of connection ports between the FTN and the BBU. When the convergence ratio is determined, the number of port connections between the FTN and the RRU and the BBU is determined, which is bound to close some ports that are not necessary, thereby reducing power consumption.

In a specific implementation, the block S230 may further include the following operation. The same network configuration parameter is obtained by combining a delay requirement and a required bandwidth. For example, the block S230 may include the following operation. At least one of the following is determined according to the delay requirement and the required bandwidth: a format of a hyper-frame transmitted by the FTN, types of each of unit-frames in the hyper-frame, the number of the unit-frames, or positions of each type of the unit-frames in the hyper-frame.

The hyper-frame may consist of multiple unit-frames, which may be of the same type or different types. The unit-frames of different types may have different frame parameters. For example, when frame lengths are different, transmission channels corresponding to the unit-frames are different. Apparently, in this case, by determining the hyper-frame format, the FTN can also know which transmission channels need to be activated, and the number of channels required for each type of transmission channel (corresponding to the transmission bandwidth). The number of the unit-frames apparently corresponds to the transmission bandwidth. A position of the unit-frame in the hyper-frame may correspond to a serial number of the transmission channel, so that the FTN can determine ports to which transmission channels correspond are specifically activated.

Figure 11:
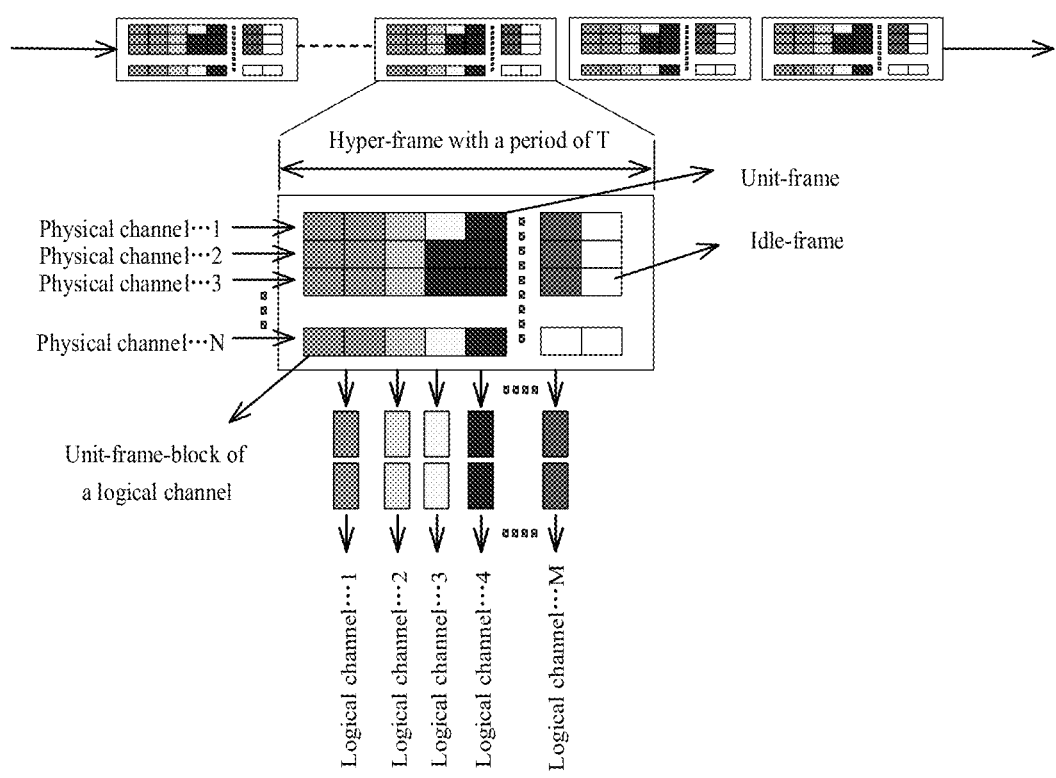
FIG. 11 illustrates a schematic diagram of a hyper-frame of an FTN according to an embodiment of the present disclosure.

FIG. 11 illustrates a frame structure of a hyper-frame provided in this example. Each hyper-frame includes multiple logical channels, and transmission resources corresponding to the logical channels are used for data transmission of the unit-frames configured in the logical channel. For example, physical channels 1 to N, an amount of all data transmitted in each time slot are configured as one hyper-frame. One hyper-frame can transmit multiple unit-frames simultaneously. For example, M logical channels are configured in FIG. 11. The logical channels here may include various types of transmission channels as described above. For example, when a third logical channel is a direct connection channel, the third logical channel can be selected to be activated according to a transmission delay and a required bandwidth of the current data. Then a physical channel corresponding to the third logical channel should be kept activating in the corresponding time slot, and the physical channel can be closed at other times to save transmit power and improve an effective utilization rate of transmission resources.

In some embodiments, the block S230 may further include the following operation. A type of a port that needs to be activated currently and/or the number of ports that need to be activated for each type are/is determined according to the delay requirement and the required bandwidth.

Further, the network configuration parameters are used to indicate the FTN to close a port that is not currently used, and/or close a port with a frequency lower than a predetermined frequency. By closing the port, the power consumption required to a carrier or a detection wave for keeping these ports to be opened can be reduced, the power consumption of the FTN can be reduced, and the effective utilization rate of resources can be improved.

In some embodiments, the method further includes the following operations.

A network topology of the FTN is obtained.

Block S230 may include the following operation.

The network configuration parameters are determined according to the delay requirement, the required bandwidth and the network topology.

The network topology may include various information, such as a type of the transmission nodes included in the FTN, the number of each type of nodes, a connection relationship between the nodes, a connection port between the nodes, the number of available ports, and so forth.

To generate specific network configuration parameters, it is required to combine the network topology of the FTN, otherwise the generated network configuration parameters may not be supported by the FTN.

In this embodiment, the operation of acquiring the network topology of the FTN may include the following actions.

The network topology of the FTN may be discovered by using a network discovery protocol; and information on connection between the RRU and the FTN and/or information on connection between the BBU and the FTN are/is received.

For example, the FTN runs a topology discovery protocol by itself, and reports a topology of the FTN to a coordinator on a transmission side to obtain the network topology of the FTN. Of course, the RRU or the BBU may also send the information on connection to the coordinator on the transmission side according to its own connection with the FTN. The coordinator on the transmission side can obtain the entire network topology of the FTN according to one or two of the foregoing two methods, thereby facilitating the determination of the network configuration parameters and reducing a phenomenon that the network configuration parameters are not supported by the FTN. While improving the effective utilization rate of FTN resources, the power consumption of the FTN is reduced as much as possible.

Figure 12:
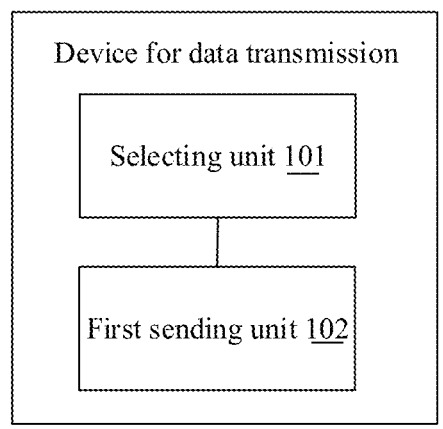
FIG. 12 illustrates a schematic structural diagram of a device for data transmission of an FTN according to an embodiment of the present disclosure.

A device for data transmission is further provided in this embodiment, which is configured to control data transmission of an FTN. The FTN includes an FTN-ACC connected to the RRU, and an FTN-AGG connected to the FTN-ACC and a BBU pool respectively. As illustrated in FIG. 12, the device for data transmission includes a selecting unit 101 and a first sending unit 102.

The selecting unit is configured to select a transmission channel established between the FTN-ACC and the FTN-AGG according to a delay requirement of data.

The first sending unit 102 is configured to transmit the data by using the transmission channel.

The selection unit and the first sending unit may both be program modules. After being executed by the processor, the selection unit and the first sending unit may be used to select a transmission channel to be established and use the established transmission channel to perform data transmission.

Figure 13:
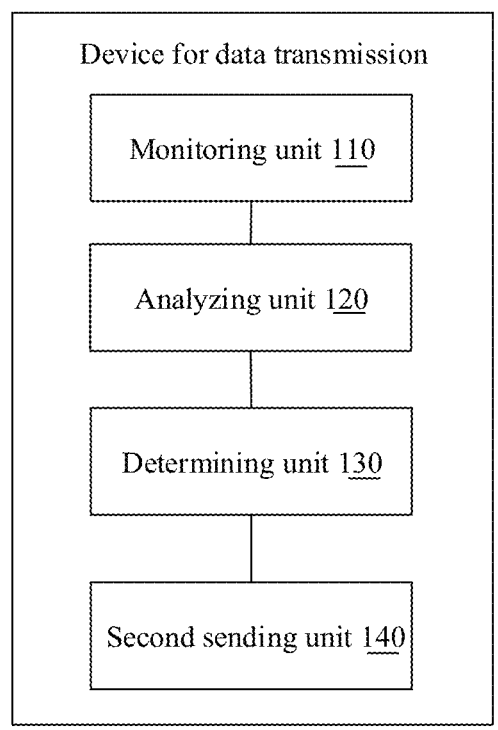
FIG. 13 illustrates a schematic structural diagram of a device for data transmission of another FTN according to an embodiment of the present disclosure.

As illustrated in FIG. 13, the device for data transmission further includes a monitoring unit 110, an analyzing unit 120, a determining unit 130 and a second sending unit 140.

The monitoring unit 110 is configured to monitor traffic condition information on a wireless network side.

The analyzing unit 120 is configured to analyze the traffic condition information and determine a delay requirement and a required bandwidth of the traffic.

The determining unit 130 is configured to determine the network configuration parameters of the FTN according to the delay requirement and the required bandwidth of the traffic.

The second sending unit 140 is configured to send the network configuration parameters to the FTN.

The control device described in this embodiment may be a device for information processing, which is applied to the aforementioned coordinator on the transmission side.

The monitoring unit 110 may correspond to a structure for acquiring the traffic condition information such as an information collector.

Both the analyzing unit 120 and the determining unit 130 may correspond to a processor or a processing circuit. The processor can include a central processing unit, a microprocessor, a digital signal processor, an application processor or a programmable array, and the like. The processing circuit can include an application specific integrated circuit. The processor or processing circuit may implement the operations of the analysis unit 120 and the determination unit 130 described above by executing predetermined instructions.

The second sending unit 140 may correspond to a sending interface, and may send network configuration information to the FTN or a transmission node in the FTN, so that the FTN or the transmission node in the FTN performs a corresponding network configuration operation to improve an effective utilization rate of resources of the FTN and reduce power consumption.

In some embodiments, the determining unit 130 is specifically configured to determine, according to the delay requirement, a type of a transmission channel to be configured by the FTN; and/or determine, according to the required bandwidth, a transmission bandwidth of the transmission channel to be configured by the FTN.

In this embodiment, the determining unit 130 directly determines, according to the delay requirement and the required bandwidth, the type and the transmission bandwidth of the transmission channel to be configured by the FTN, thereby implementing dynamic network configuration of the FTN, so that on one hand, the transmission requirement can be satisfied, on the other hand, power consumption can be reduced as much as possible and an effective utilization rate of resources can be improved.

In some embodiments, the transmission channel includes at least two of a direct connection channel, a shared channel or a hybrid channel. The determining unit 130 is specifically configured to perform at least one of the following operations.

When the delay requirement corresponds to a first transmission time delay, it is determined that the network configuration parameters include configuration parameters of the direct connection channel;

when the delay requirement corresponds to a second transmission time delay, it is determined that the network configuration parameters include configuration parameters of the hybrid channel; or when the delay requirement corresponds to a third transmission time delay, it is determined that the network configuration parameters include configuration parameters of the shared channel.

The first transmission delay is less than the second transmission delay, and the second transmission delay is less than the third transmission delay.

In this embodiment, the FTN may configure three types of transmission channels, and the corresponding transmission channels are configured to perform data transmission. On one hand, the transmission delay requirement is satisfied, and on the other hand, various overheads of the FTN are reduced as much as possible.

In the foregoing embodiment, it is specifically described that the determining unit 130 select, according to the delay requirement, a transmission channel to be configured. In this embodiment, it is specifically provided how the determining unit 130 configures the FTN according to the required bandwidth. For example, the determining unit 130 is specifically configured to determine, according to the required bandwidth, the number of connection ports activated between the FTN and the RRU; and/or, determine, according to the required bandwidth, the number of connection ports activated between the FTN and the BBU; and/or, determine, according to the required bandwidth, the number of carriers to be configured by the FTN; and/or, determine a convergence ratio between the FTN-ACC and the FTN-AGG according to the required bandwidth. The FTN-ACC is connected to the RRU, and the FTN-AGG is connected to the BBU.

Of course, in a specific implementation, the determining unit 130 may perform network configuration simultaneously in combination with the delay requirement and the required bandwidth. For example, the determining unit 130 is specifically configured to determine, according to the delay requirement and the required bandwidth, at least one of the following: a format of a hyper-frame transmitted by the FTN, types of each of unit-frames in the hyper-frame, the number of the unit-frames, or positions of each type of unit-frames in the hyper-frame.

In some embodiments, the network configuration parameters are used to instruct the FTN to close a currently unused port, and/or to close a port with a frequency lower than a predetermined frequency. By closing an inapplicable port or the port with a very low frequency, the power consumption for maintaining the port can be reduced, the idle-load phenomenon can be reduced, and the effective utilization rate of resources can be improved.

In other embodiments, the device further includes an acquisition unit and a determining unit 130.

The acquisition unit is configured to acquire a network topology of the FTN.

The determining unit 130 is configured to determine network configuration parameters according to the delay requirement, the required bandwidth and the network topology.

The acquisition unit here may correspond to a communication interface, and may acquire the network topology by receiving information from other devices, for example, a respective network topology transmitted by a transmission node of the FTN such as the FTN-AGG or the FTN-ACC.

In this embodiment, the determining unit 130 determines the network configuration parameters in a targeted manner according to the delay requirement, the required bandwidth and the network topology, so as to implement targeted configuration of the FTN.

In some embodiments, the acquisition unit is specifically configured to discover a network topology of the FTN by using a network discovery protocol; and/or, receive information on connection between a RRU and the FTN, and/or information on connection between a BBU and the FTN.

The acquisition unit in this embodiment may acquire the network topology of the FTN based on the discovery protocol, or may directly receive the information on connection from the FTN-ACC, the FTN-AGG, the RUU, the BBU or the NGFI, thereby obtaining the network topology. However, in a specific implementation, it is not limited to these technical solutions.

Several specific examples are provided below in combination with any of the above embodiments.

First Example

In this example, an FTN consists of an FTN-ACC and an FTN-AGG. The FTN-ACC and the FTN-AGG can form a ring network or a star network.

In order to satisfy the extremely low delay and large bandwidth required for the connection between the RRU using an ideal front-haul transmission interface, and the BBUs, a through-wavelength channel is established between each FTN-ACC and FTN-AGG. In order to satisfy the requirements for flexible interconnection of non-ideal front-haul transmission interfaces, a shared wavelength channel which is dropped point by point is established in the loop. The shared wavelength channel can be used to establish and cancel OAM and protection protocols between the FTN-AGG and the FTN-ACC in addition to transporting services.

The FTN-ACC locates at a service access point, i.e., being connected to the RRU. The FTN-ACC can be connected to multiple nearby RRUs via NGFI (Next Generation Front-Haul Interface) to perceive delay-sensitive services and non-delay-sensitive services. The ideal front-haul interface data, which is sensitive to delay and has high bandwidth requirements, is directly mapped to a wavelength in a point-to-point direct connection to the FTN-AGG. The non-ideal front-haul interfaces that are not sensitive to delay requirements and other services are mapped to a shared wavelength which is dropped point by point. The reconfigurable optical add-drop multiplexer (ROADM) technology is used to implement flexible scheduling of different wavelengths in the node. For the through wavelengths from other nodes, the ROADM bypasses it directly. For the shared wavelength from other nodes, the ROADM drops it to send to an electrical processing module of the FTN node for further processing. The shared wavelength can be a wavelength configured for the shared channel.

The FTN-AGG locates at the service aggregation point. The FTN-AGG converges and aggregates the services of FTN-ACCs in multiple different access layers in the form of a ring network or a star network, and sends them to a BBU pool. The FTN-AGG drops all the wavelengths, performs electrical processing and switching of the FTN nodes, and can be linked with the BBU pool to realize the dynamic linkage between a load of the BBU pool and the channel scheduling and wavelength usage of the FTN.

In order to achieve forwarding with very low delay and distinguish different service levels based on a delay, a forwarding plane of the FTN is divided into three levels. For the service with very low delay requirements, the service is directly mapped to a corresponding wavelength at the access point FTN, and are forwarded between the service access FTN-ACC and the FTN-AGG in an optical layer pass-through way, that is, the service is transmitted by using the direct connection channel. For lower-delay service, the service is transferred from the optical layer to a channel layer, and is transmitted from the channel layer to a next node, that is, a hybrid channel is used for transmission. For a packet service with normal delay, the service is scheduled by the optical layer to the channel layer and subjected to packet switching, that is, the service is transmitted by using the shared channel. By using a layered processing architecture, the same device can implement processing for different delay services.

The FTN forwarding plane runs a basic OAM mechanism on the optical layer of the point-to-point wavelength, where the OAM mechanism includes Continuity Check/Connectivity Verification (CC/CV) and the like. The OAM mechanism is run on each hop of a hop-by-hop node electrical layer. The OAM of the optical layer needs to perform a comprehensive comparison to determine a problem of the optical layer, and then notify the relevant fault detection situation by hop-by-hop transmission of the electrical layer.

For the point-to-point operating wavelength connection, a protection wavelength is established. When a fault occurs, protection signaling is transmitted by using the point-by-point shared wavelength to implement protection switching.

1) The NGFI interface can carry load requirements of the wireless side. A real-time load index (an index of the front-haul transmission bandwidth demand calculated based on the number of base station antennas, a modulation mode, etc.) can be transmitted to the FTN node via NGFI. The interface of the NGFI can be fit to a corresponding wireless load index by adjusting and activating the number of wavelengths or channels.

2) The NGFI interface can carry different delay requirements, and map a traffic to different wavelengths or channels according to the delay requirement. The FTN wavelengths are divided into the three following categories according to different delay requirements. The channel with very low delay requirement is mapped to a pass-through wavelength, directly connected to an original sink node, an intermediate node directly passes through the optical layer. A channel with high delay requirement (e.g., horizontal traffic like X2 interface) is mapped to a drop wavelength of some nodes. This wavelength is only dropped at the node with a direct connection link, and is not dropped at other nodes. Other services are mapped to the point-by-point drop wavelength, and are dropped in each node and perform packet switching to achieve sufficient statistical multiplexing.

A management domain of the FTN adopts a software defined network (SDN) controller in which management and control are integrated to realize the linkage between wireless and transmission. According to the actual service requirements of the network, a wavelength and a bandwidth are dynamically allocated according to the delay requirement.

Second Example

In this example, by using the cooperation between the wireless side and the FTN, optimizing utilization of resources is realized, and hardware resources of the device are saved under the premise of ensuring service requirements. The wireless and transmission coordinator is used to monitor traffic and a service delay requirement on the RRU side, and analyze the monitored information to further obtain information on the number of wavelengths, a convergence ratio, the number and positions of cells in a block hyper-frame of the FTN network. The relevant information is configured to the FTN device.

Figure 14:
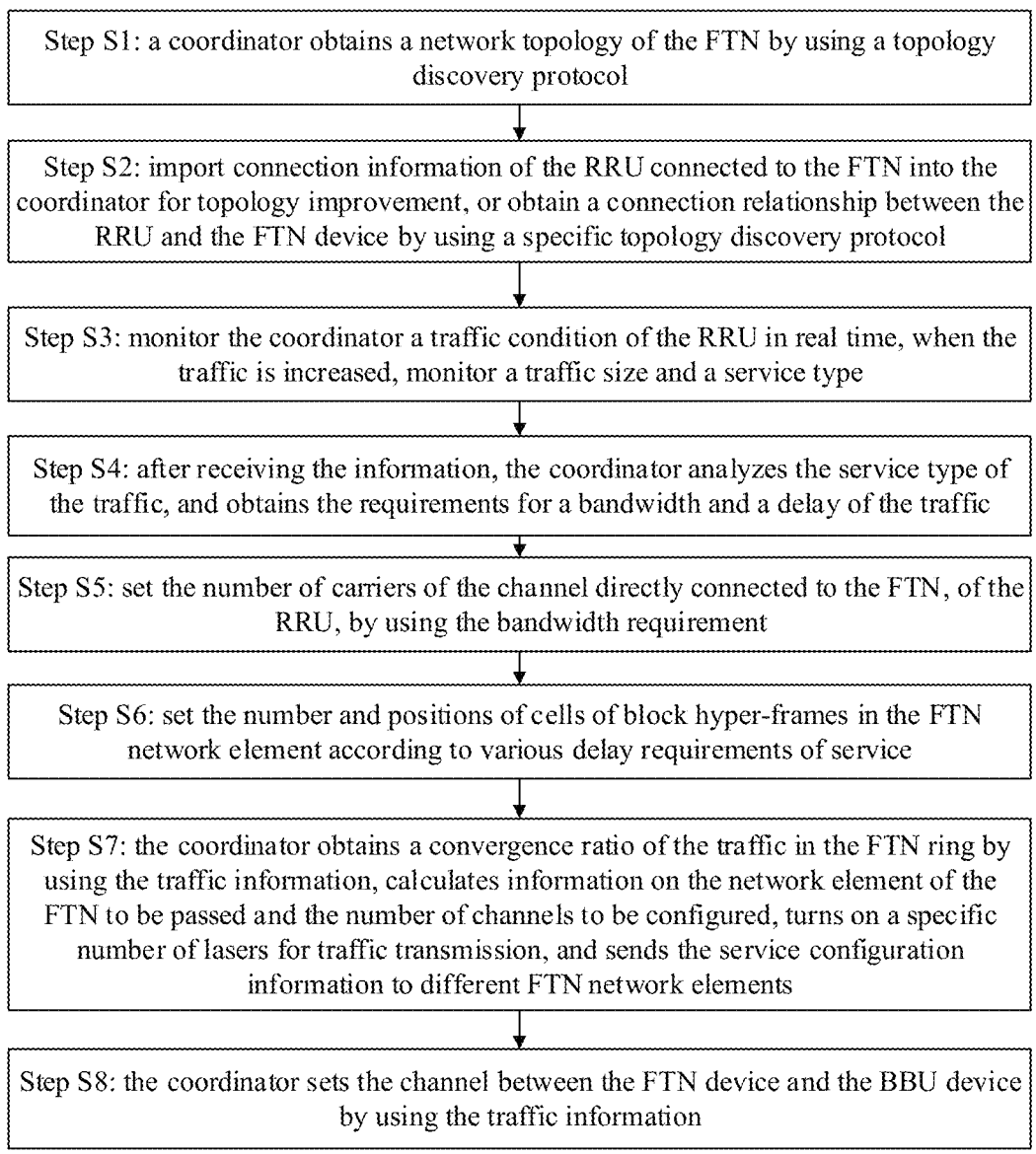
FIG. 14 illustrates a schematic flowchart of a device for data transmission of another FTN according to an embodiment of the present disclosure.

As illustrated in FIG. 14, the specific implementation operations of this example include the following actions.

At block S1, a coordinator obtains a network topology of the FTN by using a topology discovery protocol. The coordinator here may be provided on both a transmission side and a wireless side, or only on the transmission side. The transmission side here corresponds to the FTN, and the wireless side corresponds to the RRU and the BBUs.

At block S2, connection information of the RRU connected to the FTN is imported into the coordinator for topology improvement. Or a connection relationship between the RRU and the FTN device is obtained by using a specific topology discovery protocol.

At block S3, the coordinator monitors a traffic condition of the RRU in real time. When the traffic is increased, a traffic size and a service type are monitored.

At block S4, after receiving the information, the coordinator analyzes the service type of the traffic, and obtains the requirements for a bandwidth and a delay of the traffic.

At block S5, the number of carriers of the channel directly connected to the FTN, of the RRU, is set by using the bandwidth requirement. For example, a basic transmission granularity between the RRU and the FTN is 25 G, and a direct connection interface of each RRU to the FTN can include four 25 G direct connection interfaces. That is, a bandwidth of the transmission between the RRU and the FTN is at most 100 G. When 100 G traffic is transmitted, all the lasers connected to the RRU and the FTN are needed to be activated. When only the traffic below 25 G is transmitted, only one laser is needed to be turned on, which can greatly save power. (25 G, 100 G are hypothetical and can be changed)

At block S6, the number and positions of cells of block hyper-frames in the FTN network element are set according to various delay requirements of service. In the FTN network element, processing of different logical channels are different. When the RRU transmits multiple service traffics to the FTN, different traffics need to be mapped to different logical channels. In this case, the number and positions of the cells of the block frame can be flexibly and dynamically set. Blocks S5 and S6 here are not in a certain order, which may be illustrated in FIG. 7, or block S6 may be performed first, and then block S5 is performed. For example, at block S5, ports may be activated or inactivated according to the structure of the hyper-frame determined in block S6.

At block S7, the coordinator obtains a convergence ratio of the traffic in the FTN ring by using the traffic information, calculates information on the network element of the FTN to be passed and the number of channels to be configured, turns on a specific number of lasers for traffic transmission, and sends the service configuration information to different FTN network elements.

For the connection between the FTN node and the FTN node, it can be a multi-ports interconnection (taking four pairs of connected ports as an example). The basic granularity of the channel on each pair of ports is 25 G, and a maximum capacity can accommodate 4*25 G traffic, that is, the traffic between FTN and FTN can reach 4*4*25 G. In this case, 16 lasers need to be activated. However, the traffic cannot reach the peak at all times, therefore, the traffic can be monitored. A result of the statistical multiplexing can be used to control the laser, which can greatly save resources of the laser, and can also realize the transmission of multiple RRU traffics by using fewer resources. 25 G and 100 G are bandwidth distances, and various bandwidths can be used in specific implementation, which is not limited herein.

At block S8, the coordinator sets the channel between the FTN device and the BBU device by using the traffic information. The specific implementation may be as in block S5 and/or block S6.

This example describes in detail that BBUs consisted of multiple BBUs perform a workflow of a control plane of the FTN, performs port opening and closing, dynamic allocation, and dynamic scheduling of wavelength based on RRU traffic monitoring. Accordingly, the requirement can be well satisfied that the same device is used for front-haul and backhaul in the future 5G, thereby greatly saving investment cost of the transmission network construction.

The aforementioned FTN network element may include the aforementioned FTN-ACC and/or FTN-AGG.

A computer storage medium is provided in the embodiment of the present disclosure, where the computer storage medium stores computer-executable instructions. When the computer-executable instructions are executed, the method for data transmission in the foregoing one or more technical solutions can be implemented, for example, the method for data transmission illustrated in FIG. 9.

The computer storage medium may be a medium which can store program codes, such as a removable storage device, a read-only memory (ROM), a random access memory (RAM), a magnetic disk or an optical disk, and the medium may be a non-transitory storage medium.

In the several embodiments according to the present disclosure, it should be understood that the disclosed devices and methods may be implemented in other ways. The device embodiments described above are merely illustrative. For example, the division of the units is only a division of logical functions, and there may be another division manner in actual implementation. For example, multiple units or components may be combined or may be integrated into another system, or some features can be ignored or not executed. In addition, the coupling, direct coupling or communication connection of the shown or discussed components may be indirect coupling or communication connection via some interfaces, devices or units, and may be in an electrical, mechanical or other form.

The above units described as separate components may or may not be physically separated. The components displayed as units may or may not be physical units. That is, they may be arranged in one place, or may be distributed to multiple network units. Some or all of the units may be selected according to actual needs to achieve the purpose of the solution of the embodiment.

In addition, functional units in embodiments of the present disclosure may be integrated into one processing module, or each unit may exist physically separately, or two or more units may be integrated into one unit. The above integrated unit may be implemented in the form of hardware or in the form of hardware and software functional units.

Those skilled in the art will appreciate that all or a portion of actions in the above-described method embodiments may be performed by a program to instruct related hardware, the foregoing program may be stored in a computer-readable storage medium. The program, when executed, performs the operations including the above method embodiments.

The foregoing is only a specific embodiment of the present disclosure, but the scope of protection of the present disclosure is not limited thereto. All the variations or alternatives that readily occur to any of those skilled in the art within the technical scope disclosed in the present disclosure, should be covered by the scope of protection of the present disclosure. Therefore, the scope of protection of the present disclosure is subject to the scope of protection of the claims.

INDUSTRIAL APPLICABILITY

In the technical solution disclosed in the embodiment of the present disclosure, an FTN is introduced between RRU and BBU, and the FTN includes two types of transmission nodes: FTN-ACC and FTN-AGG. At least two types of transmission channels are established between the two types of transmission nodes. The two transmission channels have different transmission delays and different effective utilization rates of transmission resources. When data transmission is performed, a corresponding transmission channel is selected for data transmission according to a delay requirement of the data. Accordingly, the transmission delay requirements of different data are satisfied. The technical solution has a positive industrial effect and the characteristics of simple implementation, and can be widely used in industry.

The invention claimed is:

1. A front-haul transport network (FTN), comprising:
an access-type front-haul transport node (FTN-ACC), configured to be connected to a remote radio unit (RRU); and
an aggregation-type front-haul transport node (FTN-AGG), having one end connected to the FTN-ACC and the other end connected to a base band unit (BBU) pool;
wherein at least two types of transmission channels with different transmission delays are established between the FTN-ACC and the FTN-AGG; and at least one of the FTN-ACC or the FTN-AGG is configured to select a corresponding transmission channel for transmission according to a delay requirement of data;
wherein the transmission channel comprises at least two of a direct connection channel, a shared channel or a hybrid channel;
the direct connection channel is a direct transmission channel that uses pre-allocated transmission resources for data transmission between a source node and a sink node; when the source node is the FTN-ACC, the sink node is the FTN-AGG; when the source node is the FTN-AGG, the sink node is the FTN-ACC;

the shared channel is a statistical multiplexing channel that uses dynamically allocated transmission resources for transmission between any two adjacent transmission nodes, wherein the shared channel is a transmission path between two FTN-ACCs, or a transmission path between the FTN-ACC and the FTN-AGG;

the hybrid channel comprises a direct connection path and a shared path, wherein the direct connection path is a path that uses predetermined and pre-allocated transmission resources for transmission between transmission nodes; the shared path is a path that uses dynamically allocated transmission resources for transmission between the transmission nodes; and each of the transmission nodes is the FTN-ACC or the FTN-AGG.

2. The FTN of claim 1, wherein a ring network or a star network is established between the FTN-ACC and the FTN-AGG.

3. The FTN of claim 1, wherein the transmission resources comprise a transmission wavelength or a transmission slot; and the transmission slot comprises a transmission time duration used for a transmission wavelength.

4. The FTN of claim 1, wherein the transmission channel further comprises a protection channel; wherein the protection channel is configured to be an alternate channel being used when at least one of the direct connection channel or the direct connection path fails.

5. The FTN of claim 1, wherein the FTN further comprises a controller;
in responsive that the transmission channel fails, the controller is configured to locate a fault between any two adjacent transmission nodes of the transmission channel by using an operation administration and maintenance (OAM) mechanism.

6. The FTN of claim 1, wherein the FTN-ACC comprises an FTN interface which is a next generation front-haul interface (NGFI), and the NGFI is connected to the RRU;
the FTN further comprises a controller;
the NGFI is configured to acquire load status information; and
the controller is configured to dynamically configure different types of the transmission channels according to the load status information.

7. A method for data transmission, applied to a front-haul transport network (FTN), wherein the FTN comprises: an access-type front-haul transport node (FTN-ACC) connected to a remote radio unit (RRU); and an aggregation-type front-haul transport node (FTN-AGG) connected to the FTN-ACC and a base band unit (BBU) pool respectively; the method comprises:
selecting, according to a delay requirement of data, a transmission channel established between the FTN-ACC and the FTN-AGG; and
sending the data by using the transmission channel;
wherein the transmission channel comprises at least two of a direct connection channel, a shared channel or a hybrid channel;
the direct connection channel is a direct transmission channel that uses pre-allocated transmission resources for data transmission between a source node and a sink node; when the source node is the FTN-ACC, the sink node is the FTN-AGG; when the source node is the FTN-AGG, the sink node is the FTN-ACC;
the shared channel is a statistical multiplexing channel that uses dynamically allocated transmission resources for transmission between any two adjacent transmission nodes, wherein the shared channel is a transmission path between two FTN-ACCs, or a transmission path between the FTN-ACC and the FTN-AGG;

the hybrid channel comprises a direct connection path and a shared path, wherein the direct connection path is a path that uses predetermined and pre-allocated transmission resources for transmission between transmission nodes; the shared path is a path that uses dynamically allocated transmission resources for transmission between the transmission nodes; and each of the transmission nodes is the FTN-ACC or the FTN-AGG.

8. The method of claim 7,
wherein the selecting, according to the delay requirement of data, the transmission channel established between the FTN-ACC and the FTN-AGG comprises at least two of the following operations:
in responsive the delay requirement corresponds to a first transmission delay, selecting the direct connection channel;
in responsive the delay requirement corresponds to a second transmission delay, selecting the hybrid channel; or
in responsive the delay requirement corresponds to a third transmission delay, selecting the shared channel;
wherein the first transmission delay is less than the second transmission delay, and the second transmission delay is less than the third transmission delay.

9. The method of claim 8, further comprising:
in responsive the selected transmission channel fails, using a protection channel to transmit the data.

10. The method of claim 7, further comprising:
acquiring load status information; and
configuring, according to the load status information, the transmission channel dynamically.

11. The method of claim 7, further comprising:
in responsive the selected transmission channel fails, locating a fault between any two adjacent transmission nodes of the transmission channel by using an operation administration and maintenance (OAM) mechanism.

12. The method of claim 7, further comprising:
monitoring traffic condition information of a wireless network side;
analyzing the traffic condition information;
determining a delay requirement and a required bandwidth of traffic;
determining, according to the delay requirement and the required bandwidth of the traffic, network configuration parameters of the FTN; and
sending the network configuration parameters to the FTN.

13. The method of claim 12, wherein the determining, according to the delay requirement and the required bandwidth of the traffic, the network configuration parameters of the FTN comprises at least one of the following operations:
determining, according to the delay requirement, a type of a transmission channel to be configured by the FTN; or
determining, according to the required bandwidth, a transmission bandwidth of a transmission channel to be configured by the FTN.

14. The method of claim 12, wherein the transmission channel comprises at least two of a direct connection channel, a shared channel, or a hybrid channel;
wherein the determining, according to the delay requirement, the type of the transmission channel to be configured by the FTN comprises at least one of the following operations:

in responsive the delay requirement corresponds to a first transmission delay, determining that the network configuration parameters comprise configuration parameters of the direct connection channel;

in responsive the delay requirement corresponds to a second transmission delay, determining that the network configuration parameters comprise configuration parameters of the hybrid channel; or in responsive the delay requirement corresponds to a third transmission delay, determining that the network configuration parameters comprise configuration parameters of the shared channel;

wherein the first transmission delay is less than the second transmission delay, and the second transmission delay is less than the third transmission delay.

15. The method of claim 13, wherein the determining, according to the required bandwidth, the transmission bandwidth of the transmission channel to be configured by the FTN comprises at least one of the following operations:

determining, according to the required bandwidth, a number of connection ports opened between the FTN and the RRU;

determining, according to the required bandwidth, a number of connection ports opened between the FTN and the BBU;

determining, according to the required bandwidth, a number of carriers to be configured by the FTN; or determining, according to the required bandwidth, a convergence ratio between the FTN-ACC and the FTN-AGG, wherein the FTN-ACC is connected to the RRU, and the FTN-AGG is connected to the BBU.

16. The method of claim 12, wherein the determining, according to the delay requirement and the required bandwidth of the traffic, the network configuration parameters of the FTN comprises:

determining, according to the delay requirement and the required bandwidth, at least one of the following: a format of a hyper-frame transmitted by the FTN, types of each of unit-frames in the hyper-frame, a number of the unit-frames, or positions of each type of the unit-frames in the hyper-frame.

17. The method of claim 12, wherein the network configuration parameters are configured to instruct the FTN to perform at least one of the following operations: closing a port being unused, or closing a port with a using-frequency lower than a predetermined frequency.

18. The method of claim 12, further comprising:
acquiring a network topology of the FTN;
wherein the determining the network configuration parameters of the FTN according to the delay requirement and the required bandwidth of the traffic comprises:

determining, according to the delay requirement, the required bandwidth and the network topology, the network configuration parameters.

19. The method of claim 18, wherein the acquiring the network topology of the FTN comprises at least one of the following operations:

discovering the network topology of the FTN by using a network discovery protocol; or receiving at least one of the following: information on connection between the RRU and the FTN, or information on connection between the BBU and the FTN.

20. A device for data transmission, configured to control data transmission of a front-haul transport network (FTN), wherein the FTN comprises: an access-type front-haul transport node (FTN-ACC) connected to a remote radio unit (RRU); and an aggregation-type front-haul transport node (FTN-AGG) connected to the FTN-ACC and a base band unit (BBU) pool respectively; wherein the device for data transmission comprises:

a processor; and memory having computer executable instructions stored thereon, wherein when the computer executable instructions are executable by the processor, the processor is configured to:

select, according to a delay requirement of data, a transmission channel established between the FTN-ACC and the FTN-AGG; and send the data by using the transmission channel;

wherein the transmission channel comprises at least two of a direct connection channel, a shared channel or a hybrid channel;

the direct connection channel is a direct transmission channel that uses pre-allocated transmission resources for data transmission between a source node and a sink node; when the source node is the FTN-ACC, the sink node is the FTN-AGG; when the source node is the FTN-AGG, the sink node is the FTN-ACC;

the shared channel is a statistical multiplexing channel that uses dynamically allocated transmission resources for transmission between any two adjacent transmission nodes, wherein the shared channel is a transmission path between two FTN-ACCs, or a transmission path between the FTN-ACC and the FTN-AGG;

the hybrid channel comprises a direct connection path and a shared path, wherein the direct connection path is a path that uses predetermined and pre-allocated transmission resources for transmission between transmission nodes; the shared path is a path that uses dynamically allocated transmission resources for transmission between the transmission nodes; and each of the transmission nodes is the FTN-ACC or the FTN-AGG.

21. A non-transitory computer storage medium having stored thereon computer executable instructions; wherein in responsive the computer executable instructions are executed, the method for data transmission of claim 7 is implemented.

* * * * *